United States Patent
Bancel et al.

(10) Patent No.: US 7,954,153 B2
(45) Date of Patent: May 31, 2011

(54) SECURED COPROCESSOR COMPRISING AN EVENT DETECTION CIRCUIT

(75) Inventors: Frédéric Bancel, Lamanon (FR); Nicolas Berard, Trets (FR)

(73) Assignee: STMicroelectronics SA, Montrouge (FR)

( * ) Notice: Subject to any disclaimer, the term of this patent is extended or adjusted under 35 U.S.C. 154(b) by 1418 days.

(21) Appl. No.: 11/398,850

(22) Filed: Apr. 5, 2006

(65) Prior Publication Data

US 2006/0259673 A1    Nov. 16, 2006

(30) Foreign Application Priority Data

Apr. 5, 2005 (FR) ...................................... 05 03331

(51) Int. Cl.
*G06F 11/00* (2006.01)
*G06F 11/14* (2006.01)

(52) U.S. Cl. .......... 726/22; 713/172; 713/193; 713/194; 713/400; 726/2; 726/9; 726/20; 726/26; 726/30; 726/34; 726/35; 714/12; 714/41; 714/45; 714/48; 714/49; 714/52

(58) Field of Classification Search .................... 726/22; 713/193, 194; 714/48
See application file for complete search history.

(56) References Cited

U.S. PATENT DOCUMENTS

| | | | |
|---|---|---|---|
| 4,760,575 A | 7/1988 | Watanabe | |
| 4,996,691 A * | 2/1991 | Wilcox et al. | 714/820 |
| 5,184,032 A * | 2/1993 | Leach | 326/98 |
| 5,357,146 A * | 10/1994 | Heimann | 327/292 |
| 5,659,678 A * | 8/1997 | Aichelmann et al. | 714/25 |
| 5,694,402 A * | 12/1997 | Butler et al. | 714/732 |
| 5,949,798 A | 9/1999 | Sakaguchi | |
| 5,974,529 A | 10/1999 | Zumkehr et al. | 712/41 |
| 6,205,559 B1 * | 3/2001 | Sakaguchi | 714/25 |
| 6,357,024 B1 * | 3/2002 | Dutton et al. | 714/45 |
| 6,424,926 B1 * | 7/2002 | Mak | 702/117 |
| 6,457,145 B1 * | 9/2002 | Holmberg et al. | 714/45 |
| 6,549,022 B1 | 4/2003 | Cole, Jr. et al. | |
| 6,601,008 B1 * | 7/2003 | Madge | 702/117 |
| 6,654,465 B2 * | 11/2003 | Ober et al. | 380/264 |
| 6,714,032 B1 | 3/2004 | Reynick | |
| 6,751,749 B2 * | 6/2004 | Hofstee et al. | 714/11 |

(Continued)

FOREIGN PATENT DOCUMENTS

FR    2 746 199    9/1997

(Continued)

*Primary Examiner* — Edan Orgad
*Assistant Examiner* — Jenise E Jackson
(74) *Attorney, Agent, or Firm* — Lisa K. Jorgenson; Joshua A. Kading; Seed IP Law Group PLLC

(57) ABSTRACT

A coprocessor includes a calculation unit for executing at least one command, and a securization device. The securization device includes an error detection circuit for monitoring the execution of the command so as to detect any execution error, putting the coprocessor into an error mode by default as soon as the execution of the command begins, and lifting the error mode at the end of the execution of the command if no error has been detected, an event detection circuit for monitoring the appearance of at least one event to be detected, and a masking circuit for masking the error mode while the event to be detected does not happen, and declaring the error mode to the outside of the coprocessor if the event to be detected happens while the coprocessor is in the error mode. Application in particular but not exclusively to coprocessors embedded in integrated circuits for smart cards.

13 Claims, 2 Drawing Sheets

U.S. PATENT DOCUMENTS

| | | |
|---|---|---|
| 6,766,485 B1 | 7/2004 | Sakaguchi |
| 7,168,065 B1 | 1/2007 | Naccache et al. |
| 2002/0133773 A1 | 9/2002 | Richter et al. ............... 714/733 |
| 2003/0085621 A1* | 5/2003 | Potega ........................... 307/18 |
| 2003/0204801 A1 | 10/2003 | Tkacik et al. |
| 2003/0226082 A1* | 12/2003 | Kim et al. .................... 714/734 |
| 2004/0139346 A1 | 7/2004 | Watt et al. ..................... 713/200 |
| 2005/0273848 A1* | 12/2005 | Charles et al. ................. 726/11 |
| 2006/0267653 A1* | 11/2006 | Fulkerson .................... 327/208 |

FOREIGN PATENT DOCUMENTS

| | | |
|---|---|---|
| JP | 10-91531 | 4/1998 |

\* cited by examiner

SECURED COPROCESSOR COMPRISING AN EVENT DETECTION CIRCUIT

TECHNICAL FIELD

The present disclosure generally relates to the protection of integrated circuits against attacks by error injection, and particularly but not exclusively to the protection of integrated circuits present in smart cards. The present disclosure relates more particularly but not exclusively to a method for securing the execution of a command by a coprocessor.

BACKGROUND INFORMATION

In recent years, the techniques of hacking secured microprocessor integrated circuits (microprocessors, microcontrollers, microprocessor memories, coprocessor integrated circuits, etc.) have developed considerably. The most advanced hacking methods currently involve injecting errors at determined points of an integrated circuit during the execution of so-called sensitive operations, such as authentication operations or operations of executing a cryptography algorithm for example. Such attacks by error injection, also referred to as attacks by fault injection, enable, in combination with mathematical models, the structure of a hard-wired logic cryptography algorithm and/or the secret keys it uses to be deduced. The error injection can be done in various ways, by introducing glitches into the supply voltage of the integrated circuit, by introducing glitches into the clock signal of the integrated circuit, by exposing the integrated circuit to radiations, etc.

Coprocessors are frequently used in integrated circuits to perform specific calculations. A coprocessor is generally a peripheral microprocessor element (integrated onto the same silicon chip) used to perform determined calculations, particularly to offload the microprocessor and/or to speed up the execution time of the calculations. To this end, a coprocessor generally comprises a calculation unit (also called "data path"), a unit for controlling the calculation unit, and registers enabling input data to be loaded into the coprocessor, the coprocessor to be configured, the results of the calculations to be retrieved and the end of the calculations to be notified. The control unit is generally a state machine having a determined number of states ("finite state machine") which drives the calculation unit according to a command received. The assembly is generally hard-wired, and thus differs from a microprocessor in that it is not intended to execute a program having codes-instructions but only to execute a determined number of commands each corresponding to a determined calculation.

Now, in secured integrated circuits such as those that are incorporated into smart cards, coprocessors are frequently used to perform "sensitive" calculations, particularly cryptographic calculations, and thus handle secret keys. They are therefore mainly the target of attacks by error injection. The detection of an error injection in a coprocessor is therefore a measure to guarantee a high level of security to secured integrated circuits.

A method for monitoring the execution of a program is already known, particularly through EP 1,161,725, which involves producing cumulative signatures that vary according to the codes-instructions that run in the instruction register of a microprocessor. Such a method enables a derailment of the program being executed, particularly due to an error injection, to be detected, but does not apply to a hard-wired logic coprocessor that does not execute codes-instructions but which performs calculation sequences predefined by commands. Furthermore, the detection of a derailment in the execution of a program by a microprocessor does not enable an attack on the related coprocessor to be detected, since the latter processes each command sent by the microprocessor without interacting with the same while the processing of the command is not completed.

One classical method of detecting an attack on a coprocessor involves repeating a calculation sequence performed by the coprocessor several times, then comparing the results obtained. If these results are identical, it emerges that no attack has occurred. In this way, to make a successful attack, the error injection must be repeated several times, and in an identical manner in terms of its effects and temporal aspects. However, this method multiplies the calculation times by the number of iterations, which is a major disadvantage. Further, if an error is highlighted in connection with the state of a state machine, the injection of a fault can result in skipping a state, and thus in masking the error.

Another classical method involves providing a logic circuit dedicated to detecting error injections. Regarding the calculation unit of the coprocessor, which has no deterministic properties since the data transiting therein are not predictable, this dedicated logic circuit is formed by redundant data paths in the calculation block, which compares the identity of the signals in the redundant paths on the fly. The detection of a difference between two redundant signals triggers the activation of an error signal. Regarding the control unit of the coprocessor, which generally has a deterministic aspect, a signature circuit is used which calculates a signature, throughout the operation performed by the coprocessor, using certain control signals controlling the calculation unit. At the end of the calculation, the calculated signature is compared with an expected signature, and if a difference is detected, revealing an error injection, an alert signal is activated. Now, the comparison, whether performed by software or by a circuit, can be bypassed by an appropriate error injection. This method thus has a flaw.

BRIEF SUMMARY OF THE INVENTION

An embodiment of the present invention aims to remedy this disadvantage.

Therefore, a first embodiment of the present invention puts the coprocessor into an error mode by default as soon as the execution of a command begins, and to maintain the error mode while the smooth execution of the command is not confirmed, including when the execution of the command is completed if it has not taken place as expected.

Another embodiment of the present invention declares the error mode to the external environment of the coprocessor (generally a microprocessor) if an event happens while the coprocessor is in the error mode. This event can simply be the stopping of the execution of the command, which can be detected by a ready/busy flag. However, a voluntary error injection in a coprocessor is generally accompanied by an event provoked by the fraudor. This event is often an operation of reading a register of the coprocessor, particularly an output register, so as to examine the effect of the error injection on the coprocessor and to discover the secret data it uses. Thus, yet another embodiment of the present invention declares the error mode to the "external environment" upon detecting an event considered to be potentially "suspicious", such as the reading of an output register of the coprocessor for example.

Thus, one embodiment of the present invention provides a method for securing the execution of a command by a coprocessor, comprising putting the coprocessor into an error mode by default as soon as the execution of the command begins, monitoring the execution of the command so as to detect any execution error, lifting the error mode at the end of the execution of the command if no error has been detected in the execution of the command, or otherwise maintaining the error mode, and declaring the error mode to the outside of the coprocessor if a determined event happens while the coprocessor is in the error mode.

According to one embodiment, the coprocessor is put into the error mode by taking an internal error signal representative of the error mode to an active state, the error mode is lifted by taking the error signal to an inactive state, and the error mode is declared by supplying the outside of the coprocessor with an external error signal that copies the state of the internal error signal.

According to one embodiment, the method comprises verifying that the coprocessor is in the error mode before the processor starts processing the command, then forcing the error mode and declaring the error mode to the outside of the coprocessor if the error mode is not detected.

According to one embodiment, the determined event comprises an attempt to access at least one register of the coprocessor.

According to one embodiment, the method comprises producing, in synchronization with a clock signal, a current cumulative signature which varies according to a previous cumulative signature and to deterministic logic signals taken off in the coprocessor, until a final cumulative signature is obtained at the end of the execution of the command, comparing the current or final cumulative signature with an expected signature, and maintaining the error mode while the current cumulative signature is different from the expected signature.

According to one embodiment, a new current cumulative signature is produced at each cycle of the clock signal.

According to one embodiment, the deterministic logic signals comprise control signals applied to a calculation unit of the coprocessor by a unit for controlling the calculation unit.

According to one embodiment, the current cumulative signature is produced by a linear feedback shift register.

According to one embodiment, the expected signature is read in a dedicated register of the coprocessor.

According to one embodiment, the expected signature is selected from a plurality of expected signatures each corresponding to a command executable by the coprocessor.

An embodiment of the present invention also relates to a coprocessor comprising a calculation unit for executing at least one command, and a securisation device comprising: an error detection circuit for monitoring the execution of the command so as to detect any execution error, putting the coprocessor into an error mode by default as soon as the execution of the command begins, and lifting the error mode at the end of the execution of the command if no error has been detected, an event detection circuit for detecting the appearance of at least one determined event, and a masking circuit for masking the error mode while the determined event does not happen, and declaring the error mode to the outside of the coprocessor if the determined event happens while the coprocessor is in the error mode.

According to one embodiment, the error detection circuit puts the coprocessor into the error mode by taking an internal error signal representative of the error mode to an active state, lifts the error mode by taking the error signal to an inactive state, and declares the error mode by supplying the outside of the coprocessor with an external error signal that copies the state of the internal error signal.

According to one embodiment, two identical states of the internal and external error signals are coded by one and the same logic value.

According to one embodiment, a memory means maintains the external error signal in the active state when the latter has switched into the active state.

According to one embodiment, the event detection circuit supplies a detection signal put by default into an inactive state and taken to an active state when the determined event is detected, and the masking circuit comprises a logic circuit that masks the error mode when the detection signal is in the inactive state, and which becomes transparent to the error mode when the detection signal is in the active state.

According to one embodiment, the coprocessor comprises registers and the event detection circuit is arranged for detecting an attempt to access at least one register of the coprocessor.

According to one embodiment, the coprocessor comprises a control unit arranged for verifying that the coprocessor is in the error mode before the processor starts processing the command, for forcing the error mode and declaring it to the outside of the coprocessor if the error mode is not detected.

According to one embodiment, the error detection circuit comprises a signature calculation circuit supplying a current cumulative signature which varies according to deterministic logic signals taken off in the coprocessor and to a previous cumulative signature, until a final cumulative signature is obtained at the end of the execution of the command, and a comparison circuit for comparing the current cumulative signature and an expected signature, the output of which puts the coprocessor into the error mode while the cumulative signature is different from the expected signature.

According to one embodiment, the signature calculation circuit is paced by a clock signal and calculates a current cumulative signature at each clock cycle, by replacing each previous cumulative signature with a new current cumulative signature.

According to one embodiment, the signature calculation circuit comprises a linear feedback shift register.

According to one embodiment, the calculation unit is driven by a control unit which produces the deterministic control signals applied at input of the signature calculation circuit.

According to one embodiment, the coprocessor comprises a dedicated register for storing the expected signature.

According to one embodiment, the securisation device selects the expected signature from a plurality of pre-recorded expected signatures each corresponding to a command executable by the coprocessor.

BRIEF DESCRIPTION OF THE SEVERAL VIEWS OF THE DRAWINGS

These and other features of one or more embodiments of the present invention will be explained in greater detail in the following description of a method according and of an example of implementation of this method, given in relation with, but not limited to the following figures.

DETAILED DESCRIPTION

Embodiments of a secured coprocessor comprising an event detection circuit are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
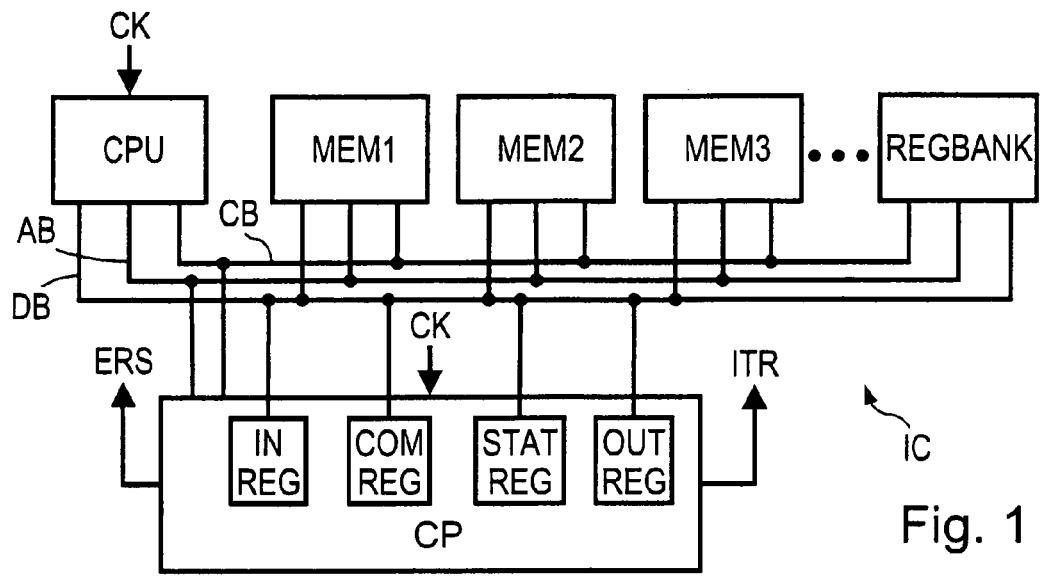
FIG. 1 schematically represents an example of architecture of a microprocessor integrated circuit comprising a coprocessor.

FIG. 1 represents an example of architecture of an integrated circuit IC in which one embodiment of the present invention is implemented. The integrated circuit IC is here of the microprocessor or microcontroller type and comprises a central processing unit CPU paced by a clock signal CK, and peripheral elements of the CPU. These peripheral elements here comprise memories MEM1, MEM2, MEM3, a register bank REGBANK, and a coprocessor CP, dedicated for example to cryptographic calculation. The memory MEM1 is for example a non-volatile memory of ROM type (read-only memory), the memory MEM2 is an electrically erasable and programmable memory of EEPROM type, and the memory MEM3 a volatile memory of RAM type.

These various peripheral elements are linked to the CPU by a data bus DB, an address bus AB and a control bus CB. "Control bus" can include a set of wires conveying selection or information signals sent by the CPU to the peripheral elements, or vice-versa. The bus CB particularly conveys signals for selecting the peripheral elements, a read or write signal R/W, and a signal FETCH sent by the CPU during the reading of a code-instruction in one of the program memories, such as MEM1 or MEM2 for example.

The coprocessor CP comprises several registers linked to the data bus DB, such as input INREG and output OUTREG registers for example enabling data to be exchanged with the CPU, a command register COMREG for receiving a command to be executed from the CPU, and a state register STATREG supplying information to the CPU about the state of the coprocessor and also enabling the CPU to act on the coprocessor. The register STATREG particularly comprises a bit RB (Ready/Busy) enabling the CPU to determine whether the coprocessor is busy or ready to receive a new command to be executed, and a bit RUN enabling the CPU to start the execution of a command once it has been loaded into the register COMREG. Thus, when the execution of a command is started, the CPU loads the command into the register COMREG, positions the bit RUN to a determined value, then the coprocessor positions the bit RB of the state register STATREG to the "busy" logic state and initiates the execution of the command. When the processing of the command is finished, the coprocessor positions the bit RB to the "ready" logic state and resets the bit RUN. By periodically monitoring the state of the bit RB, the CPU can thus determine when the coprocessor has finished the execution of a command. Alternatively, the coprocessor can send an interrupt signal ITR when it has finished processing a command, this signal being applied to an input of the interrupt decoder of the CPU.

Figure 2:
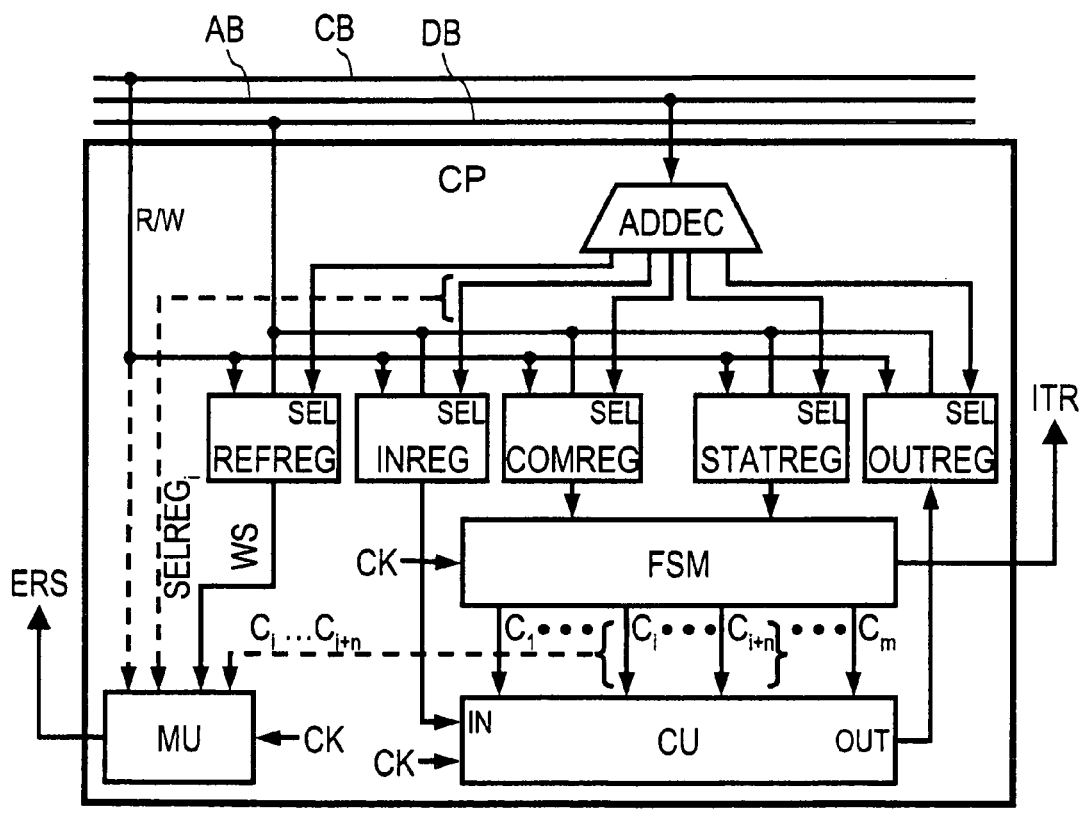
FIG. 2 represents in block form an example of architecture of a coprocessor comprising a securisation device according to an embodiment of the present invention.

As it can be seen in FIG. 2, these various registers are controlled by an address decoder ADDEC that is linked at input to the address bus AB and supplies selection signals SELREGi for selecting one of the registers according to an address sent on the bus AB, each of these selection signals being applied to a selection input SEL of the corresponding register. A read/write signal R/W taken off on the control bus CB is also applied to each of the registers, to select a mode of read or write accessing the registers.

According to one embodiment of the present invention, the coprocessor comprises a securisation device MU (FIG. 2) designed for monitoring the operation of the coprocessor during the execution of a command, so as to detect an anomaly in its execution, due in particular to an error injection, and for simultaneously monitoring certain signals received by the coprocessor so as to detect a determined event.

To avoid the detection of an error being masked by an error injection, the securisation device MU puts the coprocessor into an error mode from the very start of the execution of a command, while masking the error mode from the external environment (here the CPU) while the event to be detected does not happen. The error mode is deactivated by the device MU at the end of the execution of the command if no execution error has been detected during this execution.

When the event to be detected happens while the coprocessor is in the error mode, the error mode is declared to the external environment by taking an external error signal ERS to an active value. Upon receiving or detecting the external error signal ERS on the active value, any appropriate measure can be taken, such as resetting the CPU, erasing sensitive data from one of the memories, or even completely taking the integrated circuit out of service.

According to the embodiment represented in FIG. 2, the event to be detected can include an attempt to read one or more registers, particularly the output register OUTREG. To this end, the device MU receives the read or write selection signal R/W sent by the control bus CB, and all or part of the register selection signals $SELREG_i$ supplied by the address decoder ADDEC, more particularly those corresponding to the registers the read-access to which must be monitored.

The execution of the commands supplied by the CPU is classically performed by a control block FSM and a calculation unit CU driven by the control block FSM, these elements being produced with hard-wired logic. The control block FSM is a finite state machine paced by a clock signal, here the clock signal CK of the CPU. The block FSM is arranged for determining a current state according to a previous state and to input signals proceeding in particular from the registers COMREG and STATREG. Each state of the control block FSM is determined by a set of control signals $C_1$ to $C_m$ that is applied in whole or part to the calculation unit CU. The latter processes input data proceeding from the input register INREG according to the control signals and delivers output data that are written in one or more registers of the coprocessor, particularly in the output register OUTREG. At the end of the calculation corresponding to the processing of a command, the control block FSM positions the bit RB (Ready/Busy) to the "ready" logic state and/or activates the interrupt signal ITR to indicate to the CPU that the processing is finished.

Figure 3:
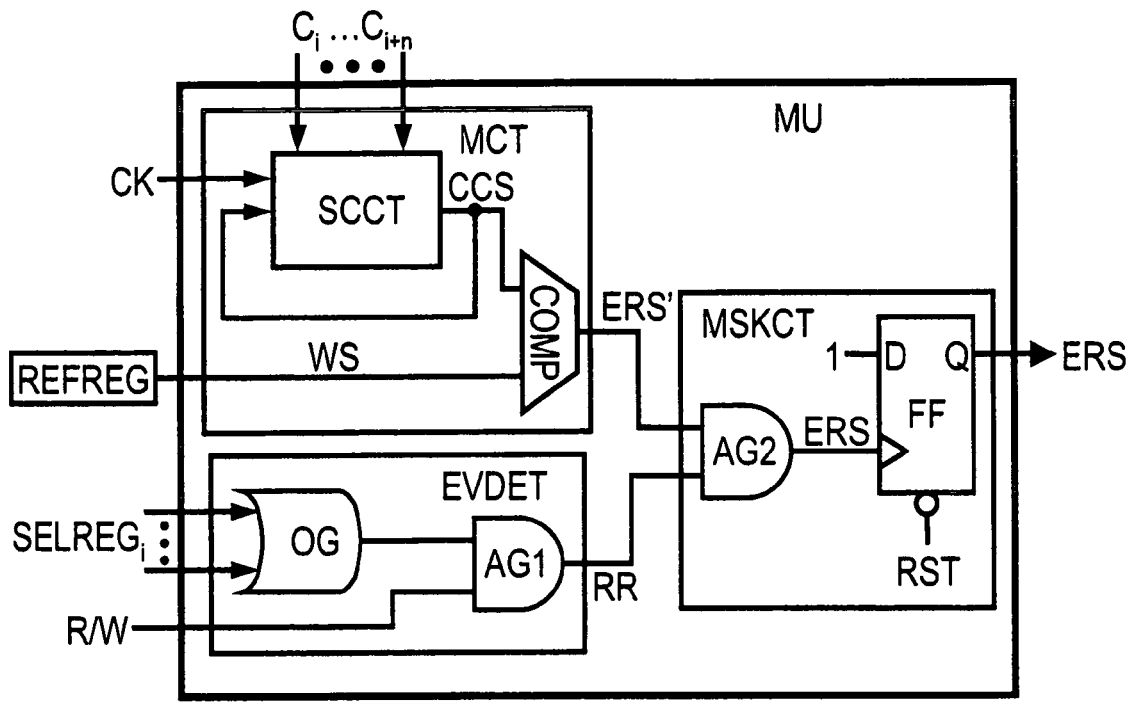
FIG. 3 represents in block form an example of an embodiment of the securisation device in FIG. 2.

FIG. 3 represents an example of an embodiment of the securisation device MU. This device comprises an error detection circuit MCT, an event detection circuit EVDET, and a circuit MSKCT for masking the error mode. To understand the diagram, it will be noted that the active state of the various signals described below corresponds here by convention to the logic value "1".

The error detection circuit MCT monitors the execution of a command and, as soon as the execution of the command begins, supplies an internal error signal ERS' that has an active state representative of the error mode, and an inactive state representative of the lifting of the error mode.

To this end, the circuit MCT comprises a hard-wired logic signature calculation circuit SCCT receiving deterministic logic signals $C_i$ to $C_{i+n}$ at parallel inputs. These signals $C_i$ to $C_{i+n}$ are selected here from the control signals $C_1$ to $C_m$ supplied by the control block FSM (FIG. 2) and are deterministic (predictable) in that they only depend on the command the coprocessor is executing. The circuit SCCT comprises an output that is sent back to one of its inputs and which supplies a current cumulative signature CCS. Each current cumulative signature CCS therefore varies according to the signals $C_i$ to $C_{i+n}$ and to a previous cumulative signature. The signatures are calculated at the pace of a clock signal, such as the clock signal CK of the CPU for example. The current cumulative signature CCS is applied to an input of a comparator COMP the other input of which receives an expected signature WS. The comparator comprises an inverting output that supplies the internal error signal ERS', such that the latter remains equal to 1 (active state, error mode) while the calculated current signature CCS is different from the expected signature WS.

Thus, the circuit MCT puts the coprocessor into the error mode (ERS'=1) by default while the processing of the command is not finished. The error mode is further maintained when the processing of the command is finished, if an execution error has been detected (because the expected signature is not obtained).

The expected signature WS is saved in any storage means, here an additional register REFREG of the coprocessor to which the circuit MCT is linked (FIG. 2 and FIG. 3). As this signature varies according to the command to be executed, it can be written in the register REFREG by the CPU itself before the coprocessor is activated (triggered by the positioning of the bit RUN). Alternatively, the means for storing the signature WS can be a table or a set of registers of the coprocessor in which various expected signatures are pre-recorded, each signature corresponding to a command from a set of commands of the coprocessor. In this case, one of the expected signatures is selected in the table or in one of the specific registers when a command is loaded into the register COMREG.

The event detection circuit EVDET supplies a signal RR that is in the active state when the event being monitored is detected, here an attempt to read a register of the coprocessor. To this end, it comprises an OR-type gate OG with several inputs and an AND-type gate AG1 with two inputs. The gate OG receives the signals $SELREG_i$ for selecting the registers of the coprocessor the read access to which is to be monitored, and its output changes to 1 when one of the registers being monitored is selected by the address decoder ADDEC (FIG. 2). The output of the gate OG is applied to an input of the gate AG1 the other input of which receives the signal R/W described above and the output of which supplies the signal RR. As the signal RAN is by convention equal to 1 here for a read access, the signal RR changes to 1 (active value) when an attempt to read-access certain registers is detected.

The masking circuit MSKCT receives the internal error signal ERS'EF and the detection signal RR, and supplies the external error signal ERS. The signal ERS is in the active state when the error mode is declared to the external environment of the coprocessor (here the CPU), and in the inactive state when the error mode is masked. To this end, the circuit MSKCT comprises an AND-type gate AG2 receiving the signal ERS' and the signal RR at its inputs, and supplying the external error signal ERS. Thus, when the internal error signal ERS' is on 1 (active value, error mode) the signal ERS remains on 0 (error mode masked) while the signal RR is on 0 (no detection of an attempt to read-access a register being monitored). The change to 1 of the signal ERS thus indicates that an attempt to access a register being monitored has occurred (RR=1) although the expected signature WS is not obtained (ERS'=1) or has not been obtained by the end of the execution of the command.

The switch of the error signal ERS from the inactive state to the active state is preferably stored by the circuit MSKCT. This storing is here performed by a flip-flop FF comprising a D input, a non-inverting Q output and a clock input H. The logic value 1 is applied permanently to the D input, the external error signal ERS is applied to the input H and is retrieved at the Q output to be sent to the external environment. Thus, the change to 1 of the error signal ERS causes the change to 1 of the Q output, which copies the D input. In this way, the error signal ERS is copied in a stable manner when the error signal ERS at the H input changes to 1 in a fleeting manner following an attempt to access a register being monitored while the expected signature WS is not yet obtained or has not been obtained by the end of the execution of the command. In order to reset the device after processing an error, the flip-flop FF receives a reset signal RST that is activated after the error has been processed.

In summary, while the processing of the command by the coprocessor is not finished, the calculated signature is different from the expected value and the coprocessor is by default in the error mode. If an attempt to read one of the registers being monitored is made during the execution time of the command, the error mode is declared by taking the external error signal ERS to its active value. At the end of the processing performed by the coprocessor, if the processing of the command performed by the coprocessor has not been disturbed, particularly by an error injection, the calculated signature is normally equal to the expected signature and the coprocessor then leaves the error mode. In the opposite case, the signature calculated at the end of the processing is different from the expected signature and the error mode is not lifted. Any attempt to access a register being monitored thus causes the external error signal ERS to change to the active state, despite the fact that the execution of the command is completed.

As indicated above, the change of the external error signal ERS to the active state causes the CPU to stop or be reset or causes any other emergency measure known to those skilled in the art.

It shall be noted that if the CPU must detect the end of the processing performed by the coprocessor by periodically reading the state register STATREG, it must be able to access the register STATREG without such access activating the external error signal. Thus, the selection signal $SELREG_i$ corresponding to this register must not be applied to the detection circuit EVDET.

Figure 4:
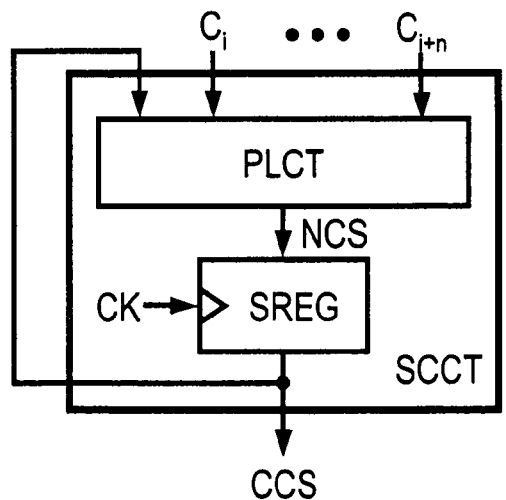
FIG. 4 represents an example of an embodiment of an element present in the securisation device in FIG. 3.

As represented in FIG. 4, the signature calculation circuit SCCT is for example a linear feedback shift register LSFR. It comprises a logic circuit PLCT and a signature register SREG with parallel input and output. The circuit PLCT executes a signature function Fs and comprises inputs receiving the control signals $C_i$ to $C_{i+n}$ as well as an input receiving a current cumulative signature CCS. The output of the circuit PLCT supplies to the input of the register SREG a next cumulative signature NCS that varies according to the current cumulative signature CCS and to the signals applied to its others inputs, e.g.:

$$NCS=Fs(CCS, C_i, \ldots, C_{i+n}) \qquad (1)$$

Upon each new clock cycle CK, the register SREG copies to its output the signature present at its input, such that the next signature supplied by the circuit PLCT during the previous clock cycle becomes the current signature, and the current signature of the previous clock cycle becomes the previous signature PCS for the next signature, e.g.:

$$CCS=Fs(PCS, C_i, \ldots, C_{i+n}) \qquad (2)$$

the relation (2) being equivalent to the relation (1) seen from the output of the register SREG.

For the sake of simplicity, various signals that can easily be provided by those skilled in the art have not been described above, only the signals required to understand the embodiment(s) of the present invention having been mentioned.

It will be understood by those skilled in the art that various alternative embodiments and improvements of the present invention are possible.

In particular, although the securisation device MU was described above as an element distinct from the control block FSM, it can be integrated into the control block and additional capabilities relating to security can be provided. In particular, in one embodiment, the block FSM is arranged for verifying that the internal error signal ERS' is on the active value before initiating the execution of a command. If that is not the case, the block FSM forces the external error signal ERS to the active value and puts itself into a determined state that it can only leave after the coprocessor has been completely reset.

Furthermore, it goes without saying that the logic values described above corresponding to the active state of the error signals ERS', ERS only have a relative value. Other values can be chosen, such as the value "1" for the active state of the internal error signal ERS' and the value "0" for the active state of the external error signal ERS for example. In this case, the signal ERS is set to 0 when the signal ERS' is on 1, since it is not the logic value that is copied but the active or inactive state of the internal error signal to which a logic value is associated by convention which can be different for the internal error signal and for the external error signal.

Furthermore, those skilled in the art will be able to provide other embodiments of a securisation device enabling the coprocessor to be taken into an error mode by default, and the error mode to be declared to the external environment when the conditions described above are met. Thus, although an example of managing the internal error mode was described above based on the use of an internal error signal communicated to the external environment as an external error signal when the prescribed conditions are met, the internal error mode can be declared to the external environment in various other ways. For example, the securisation device MU can act on specific flags provided in the state register STATREG of the coprocessor, such as a flag representative of the error mode and a flag indicating whether the event to be monitored has been detected. A warning device external to the coprocessor can be assigned to the permanent or non-permanent monitoring of these flags and send the external error signal itself. This external device can further be programmable according to several levels of security, to conduct or trigger specific actions when the error conditions are met, according to a security level communicated to it by the CPU.

The smooth execution of the command can furthermore be monitored in several ways, for example by applying control techniques mentioned in the preamble, based on a redundancy of the data paths present in the calculation unit of the coprocessor, or by combining such techniques with the one based on producing signatures varying according to deterministic signals.

The event to be monitored can be any type of event relating in particular to attempted fraud, and is not necessarily an attempt to read a register, and the identification of the events to be put under monitoring obviously depends on the architecture of the coprocessor and the operations entrusted thereto. It may be an attempt to write to a register, an attempt to access a unit of the coprocessor, etc., and generally speaking an action proceeding from the outside of the coprocessor and concerning the coprocessor.

The event may also be unrelated to any attempted fraud, and simply be an event which is certain to occur after the processing of a command, such as the stopping of the process of executing the command itself. In this case, such an event is used to declare the error mode to the external environment, and by analogy it is used as a "trigger" by the securisation system according to the present invention, which is "armed" as soon as the execution of the command begins.

In addition, several events of different types can be simultaneously put under monitoring, by triggering the emission of the external error signal when an event from the set of events being monitored occurs ("OR" logic function) or by triggering the emission of the external error signal when all of the events being monitored occur ("AND" logic function).

Finally, the notion of coprocessor within the meaning of the present invention must be understood in a non-limitative manner. Generally speaking, a coprocessor within the meaning of the present invention is a hard-wired logic circuit provided for executing specific operations in response to a command supplied to it. Thus, for example hard-wired logic circuits controlling data or address buses in microprocessors or microcontrollers or which control access to memories can be secured by means of the present invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for securing an execution of a command by a coprocessor, the method comprising:

putting the coprocessor into an error mode by default as soon as the execution of the command begins;

monitoring the execution of the command so as to detect any execution error;

lifting the error mode at an end of the execution of the command if no error has been detected in the execution of the command, or otherwise maintaining the error mode; and declaring the error mode to an outside of the coprocessor if a particular event happens while the coprocessor is in the error mode.

2. A method according to claim 1 wherein:

the coprocessor is put into the error mode by taking an internal error signal representative of the error mode to an active state;

the error mode is lifted by taking the error signal to an inactive state; and the error mode is declared by supplying the outside of the coprocessor with an external error signal that copies a state of the internal error signal.

3. A method according to claim 1, further comprising verifying that the coprocessor is in the error mode before the coprocessor starts processing the command, then forcing the error mode and declaring the error mode to the outside of the coprocessor if the error mode is not detected.

4. A method according to claim 1 wherein the particular event comprises an attempt to access at least one register of the coprocessor.

5. A method according claim 1, further comprising:

producing, in synchronization with a clock signal, a current cumulative signature which varies according to a previous cumulative signature and to deterministic logic signals, until a final cumulative signature is obtained at the end of the execution of the command;

comparing the current or final cumulative signature with an expected signature; and maintaining the error mode while the current cumulative signature is different from the expected signature.

6. A method according to claim 5 wherein a new current cumulative signature is produced at each cycle of the clock signal.

7. A method according to claim 5 wherein the deterministic logic signals comprise control signals applied to a calculation unit of the coprocessor by a unit for controlling the calculation unit.

8. A method according to claim 5 wherein the current cumulative signature is produced by a linear feedback shift register.

9. A method according to claim 5 wherein the expected signature is read in a dedicated register of the coprocessor.

10. A method according to claim 5 wherein the expected signature is selected from a plurality of expected signatures each corresponding to a command executable by the coprocessor.

11. An apparatus for securing an execution of a command by a coprocessor, the apparatus comprising:

means for putting the coprocessor into an error mode by default at a beginning of an execution of the command;

means for monitoring the execution of the command to detect an execution error;

means for lifting the error mode at an end of the execution of the command if no execution error has been detected and for otherwise maintaining the error mode; and means for declaring the error mode externally to the coprocessor if a particular event is detected while the coprocessor is in the error mode.

12. The apparatus of claim 11, further comprising:

means for producing, in synchronization with a clock signal, a current cumulative signature that varies according to a previous cumulative signature and according to deterministic logic signals, until a final cumulative signature is obtained at the end of the execution of the command;

means for comparing the current cumulative signature with a reference signature; and means for maintaining the error mode if the current cumulative signature is different from the reference signature.

13. The apparatus of claim 11, further comprising means for verifying that the coprocessor is in the error mode before the coprocessor starts processing the command, then for forcing the error mode and for declaring the error mode externally to the coprocessor if the error mode is not detected.

* * * * *